US012397252B2

(12) United States Patent
Stoneham et al.

(10) Patent No.: US 12,397,252 B2
(45) Date of Patent: Aug. 26, 2025

(54) FILTER HOUSING WITH DROP OUT CHAMBER AND METHODS

(71) Applicant: Donaldson Company, Inc., Bloomington, MN (US)

(72) Inventors: Ross C. J. Stoneham, Ferndown (GB); Colin G. MacAlpine, Motcombe (GB)

(73) Assignee: Donaldson Company, Inc., Bloomington, MN (US)

( * ) Notice: Subject to any disclaimer, the term of this patent is extended or adjusted under 35 U.S.C. 154(b) by 496 days.

(21) Appl. No.: 17/724,022

(22) Filed: Apr. 19, 2022

(65) Prior Publication Data

US 2022/0339570 A1   Oct. 27, 2022

Related U.S. Application Data

(60) Provisional application No. 63/177,681, filed on Apr. 21, 2021.

(51) Int. Cl.
*B01D 53/22*   (2006.01)
*B01D 46/00*   (2022.01)

(52) U.S. Cl.
CPC ..... *B01D 46/0005* (2013.01); *B01D 46/0004* (2013.01); *B01D 2201/304* (2013.01); *B01D 2201/305* (2013.01)

(58) Field of Classification Search
CPC ........ B01D 2201/204; B01D 2201/304; B01D 46/0005; B01D 46/0004; B01D 2201/305
See application file for complete search history.

(56) References Cited

U.S. PATENT DOCUMENTS

| | | | |
|---|---|---|---|
| 2,932,362 A | | 4/1960 | Roper |
| 3,177,880 A | * | 4/1965 | Lee ..................... A47L 15/4221 |
| | | | 134/191 |
| 4,227,903 A | | 10/1980 | Gustavsson et al. |
| 5,022,897 A | * | 6/1991 | Balcar ................... B01D 39/06 |
| | | | 96/373 |
| 5,803,941 A | * | 9/1998 | Berkhoel ........... B01D 46/2411 |
| | | | 55/498 |

(Continued)

FOREIGN PATENT DOCUMENTS

| | | |
|---|---|---|
| CN | 110721546 A | 1/2020 |
| DE | 2536568 A1 | 2/1977 |

(Continued)

OTHER PUBLICATIONS

International Search Report and Written Opinion for PCT/IB2022/000236 mailed Aug. 3, 2022, 14pgs.

*Primary Examiner* — Anthony R Shumate
(74) *Attorney, Agent, or Firm* — Merchant & Gould P.C.

(57) ABSTRACT

A filter housing includes a container with a surrounding wall defining an open interior volume; the container having an access opening in communication with the interior volume;) a filter element in the interior volume; the filter element having an inlet face and outlet face and oriented for filtering gas by gas flow through the inlet face and out through the outlet face; a lid removably mounted on the container to cover the access opening; and a gas inlet and gas outlet in at least one of the container and lid; the gas inlet and gas outlet being co-planar. The gas inlet and the filter element are arranged such that inlet gas turns at least 90° to flow from the gas inlet to the inlet face of the filter element.

18 Claims, 9 Drawing Sheets

(56) References Cited

U.S. PATENT DOCUMENTS

| | | | | |
|---|---|---|---|---|
| 6,139,607 | A * | 10/2000 | Coulonvaux | B01D 46/0004 |
| | | | | 55/504 |
| 6,210,469 | B1 | 4/2001 | Tokar | |
| 6,676,720 | B1 | 1/2004 | Simonsen | |
| 2010/0058930 | A1* | 3/2010 | Schuster | B01D 46/2414 |
| | | | | 55/318 |
| 2013/0199792 | A1* | 8/2013 | Backes | E21B 43/0122 |
| | | | | 166/335 |
| 2014/0069521 | A1* | 3/2014 | Sakai | F17C 13/002 |
| | | | | 55/495 |
| 2015/0128546 | A1* | 5/2015 | Walker | B01D 46/0004 |
| | | | | 55/502 |
| 2016/0288042 | A1* | 10/2016 | Billiet | B01D 46/0004 |
| 2020/0164297 | A1* | 5/2020 | Liao | B01D 46/0005 |
| 2021/0086118 | A1* | 3/2021 | Tripathi | B01D 46/2414 |

FOREIGN PATENT DOCUMENTS

| | | |
|---|---|---|
| EP | 422740 A2 | 4/1991 |
| GB | 2008969 B | 6/1982 |
| GB | 2499495 B | 11/2014 |
| WO | 0044474 A1 | 8/2000 |
| WO | 0056499 A1 | 9/2000 |

* cited by examiner

FILTER HOUSING WITH DROP OUT CHAMBER AND METHODS

This application claims the benefit of U.S. Provisional Patent Application No. 63/177,681, filed Apr. 21, 2021, which is incorporated by reference herein in its entirety.

TECHNICAL FIELD

This disclosure concerns a filter housing in a filter assembly for use in capturing hazardous particulate and gaseous/vaporized matter. In particular, this disclosure concerns a filter housing with a drop out chamber and methods.

BACKGROUND

In many industries such as electronics fabrication, laser marking, laser cutting, engraving, and pharmaceuticals, extraction systems are used to capture hazardous particulate and gaseous or vaporized matter generated by industrial processes.

Such systems can include particulate filters and/or a gas filter housed in a single unit, together with either a blower or a pump. The blower or pump will draw contaminated air into the unit and through the filters.

While a variety of filter assemblies have been used, improvements are desirable. For example, the internal filter element can be expensive, and ways to extend the life of the filter element are desirable.

SUMMARY

A filter housing and methods are provided to improve the prior art.

In one aspect, a filter housing is provided comprising: (a) a container with a surrounding wall defining an open interior volume; the container having an access opening in communication with the interior volume; (b) a filter element in the interior volume; the filter element having an inlet face and outlet face and oriented for filtering gas by gas flow through the inlet face and out through the outlet face; (c) a lid removably mounted on the container to cover the access opening; and (d) a gas inlet and gas outlet in at least one of the container and lid; the gas inlet and gas outlet being co-planar. The gas inlet and the filter element are arranged such that inlet gas turns at least 90° to flow from the gas inlet to the inlet face of the filter element.

Preferably, the lid includes the gas inlet and the gas outlet.

In example embodiments, the gas outlet includes an outlet tube extending into the interior volume of the container; and the filter element has an outlet opening receiving the outlet tube.

In many example implementations, the filter element includes: (a) a media pack having the inlet face and the outlet face; and (b) a casing holding the media pack; wherein the casing includes an outlet wall spaced from the outlet face; the outlet wall defining the outlet opening of the filter element.

In some examples, the casing has a surrounding wall extending between the outlet wall and the inlet face of the media pack.

In preferred implementations, the surrounding wall of the casing provides a baffle for inlet flow from the gas inlet to the inlet face of the media pack.

In one or more example embodiments, the media pack comprises pleated media.

Preferably, the gas inlet and the filter element are arranged such that inlet gas turns between 160°-200° to flow from the gas inlet to the inlet face of the filter element.

In one or more example embodiments, the container includes a ledge protruding into the interior volume constructed and arranged to hold the filter element.

In example implementations, the container includes a filtering compartment and a debris collector disposed below the filtering compartment; the filtering compartment and debris collector separated by a sloping wall having an aperture; the aperture covered by an openable and closeable fitment.

In preferred embodiments, a seal arrangement between the compartment and the lid, and a clamp arrangement providing a releasable clamping force holding the compartment and lid together in sealing engagement.

In another aspect, a method of filtering a gas is provided. The method includes: (a) providing a container, a filter element in an interior volume of the container; and a lid mounted on the container; and (b) allowing gas to flow through a gas inlet, turn at least 90°, flow into the filter element, and then exit through a gas outlet. The inlet and gas outlet are co-planar.

In example methods, the gas turns between 160°-200° to flow into the filter element.

Preferably, the filter element includes a media pack having the inlet face and the outlet face; and a casing holding the media pack; wherein the casing has an outlet wall and a surrounding wall, the surrounding wall extending between the outlet wall and the inlet face of the media pack; and the step of allowing gas to flow includes the surrounding wall being a baffle for inlet flow from the gas inlet to the inlet face of the media pack.

In example methods, the container includes a filtering compartment and a debris collector disposed below the filtering compartment; and while the gas flows from the gas inlet to the filter element, debris drops by gravity to a bottom of the filtering compartment.

A variety of examples of desirable product features or methods are set forth in the description that follows, and in part, will be apparent from the description, or may be learned by practicing various aspects of this disclosure. The aspects of this disclosure may relate to individual features as well as combinations of features. It is to be understood that both the foregoing general description and the following detailed description are explanatory only, and are not restrictive of the claimed invention

DETAILED DESCRIPTION

Figure 1:
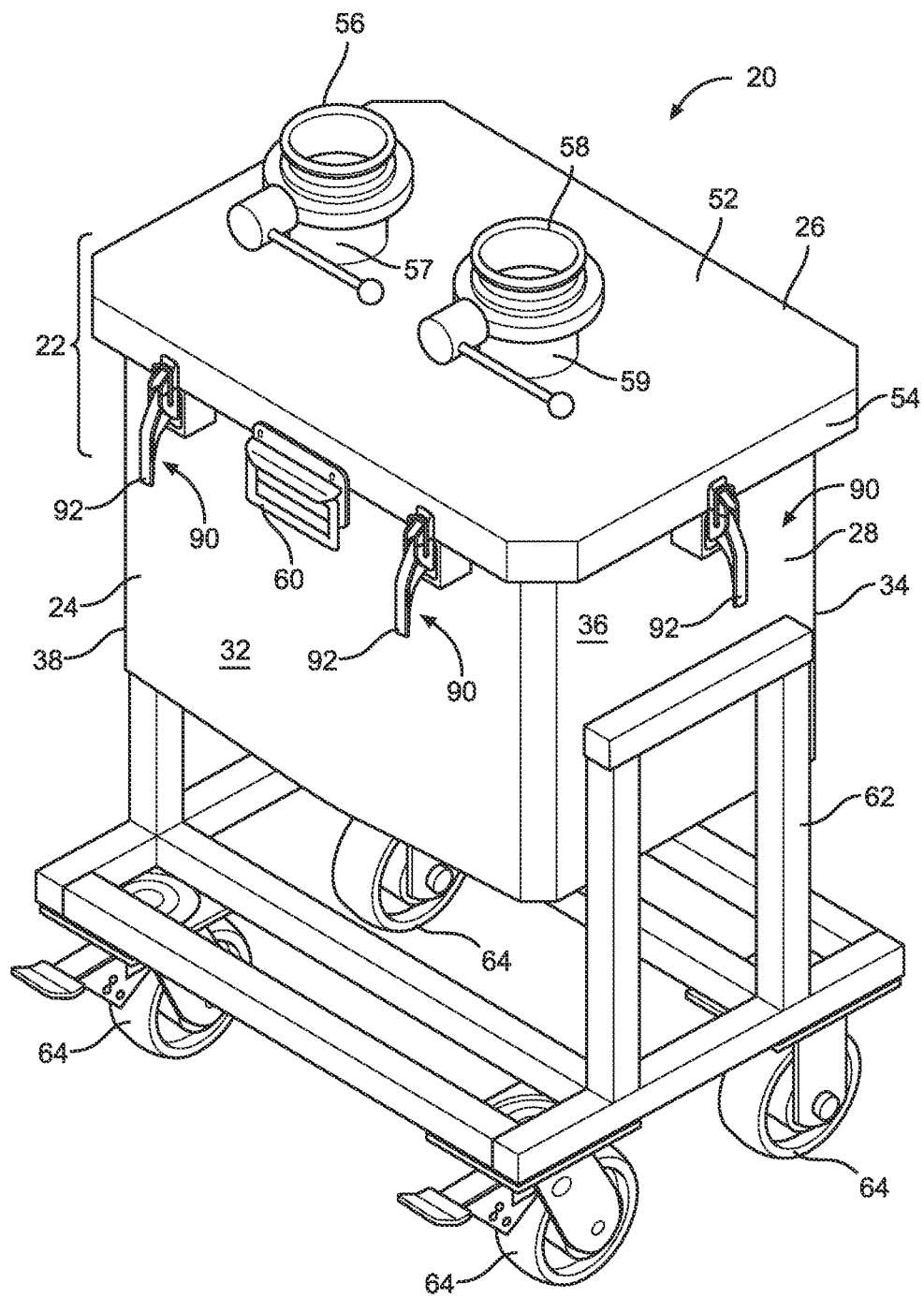
FIG. 1 is a perspective view of a filter assembly including a filter housing, constructed in accordance with principles of this disclosure.
Figure 2:
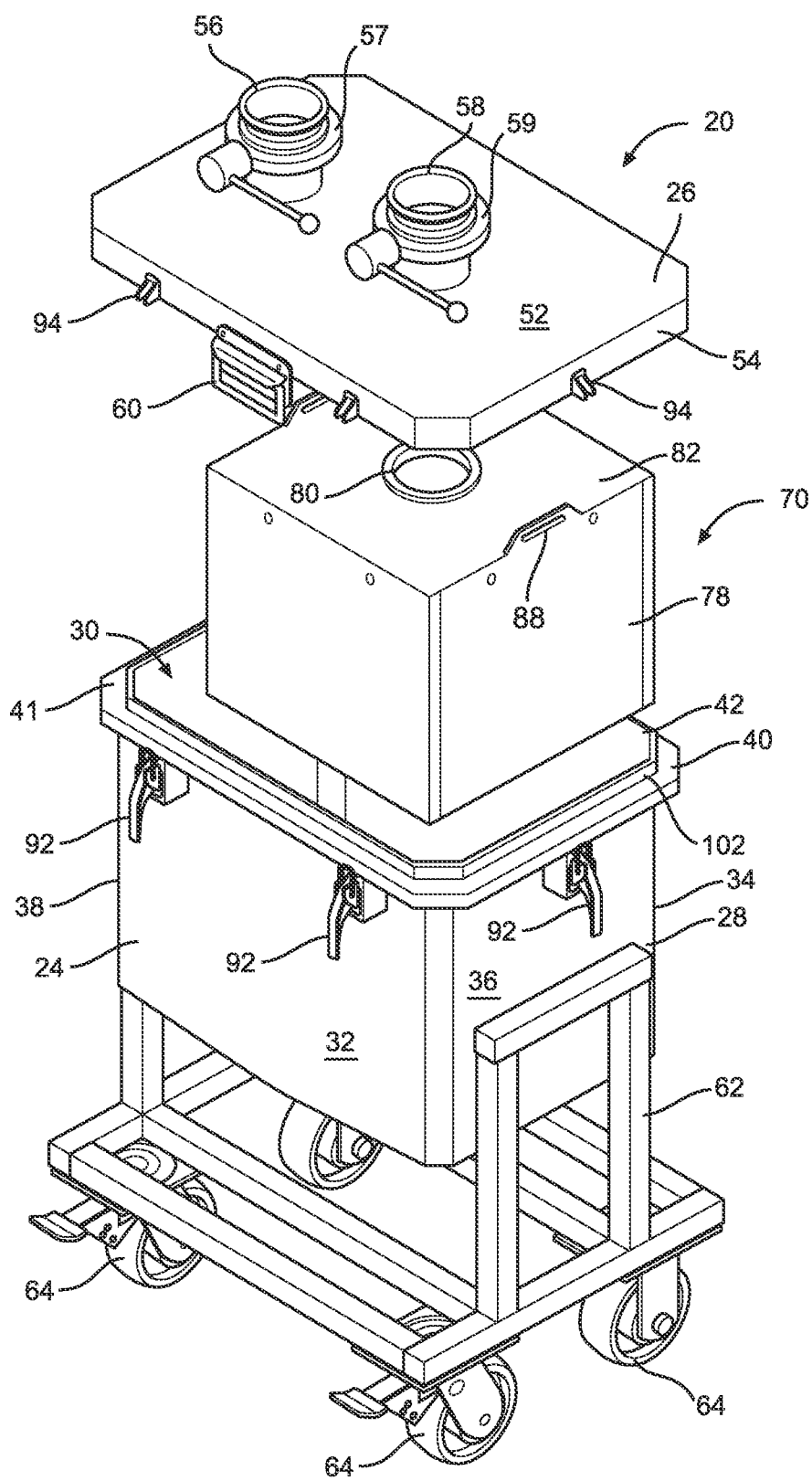
FIG. 2 is an exploded, perspective view of the filter assembly of FIG. 1, in which a filter element can be seen exploded out of the filter housing.
Figure 3:
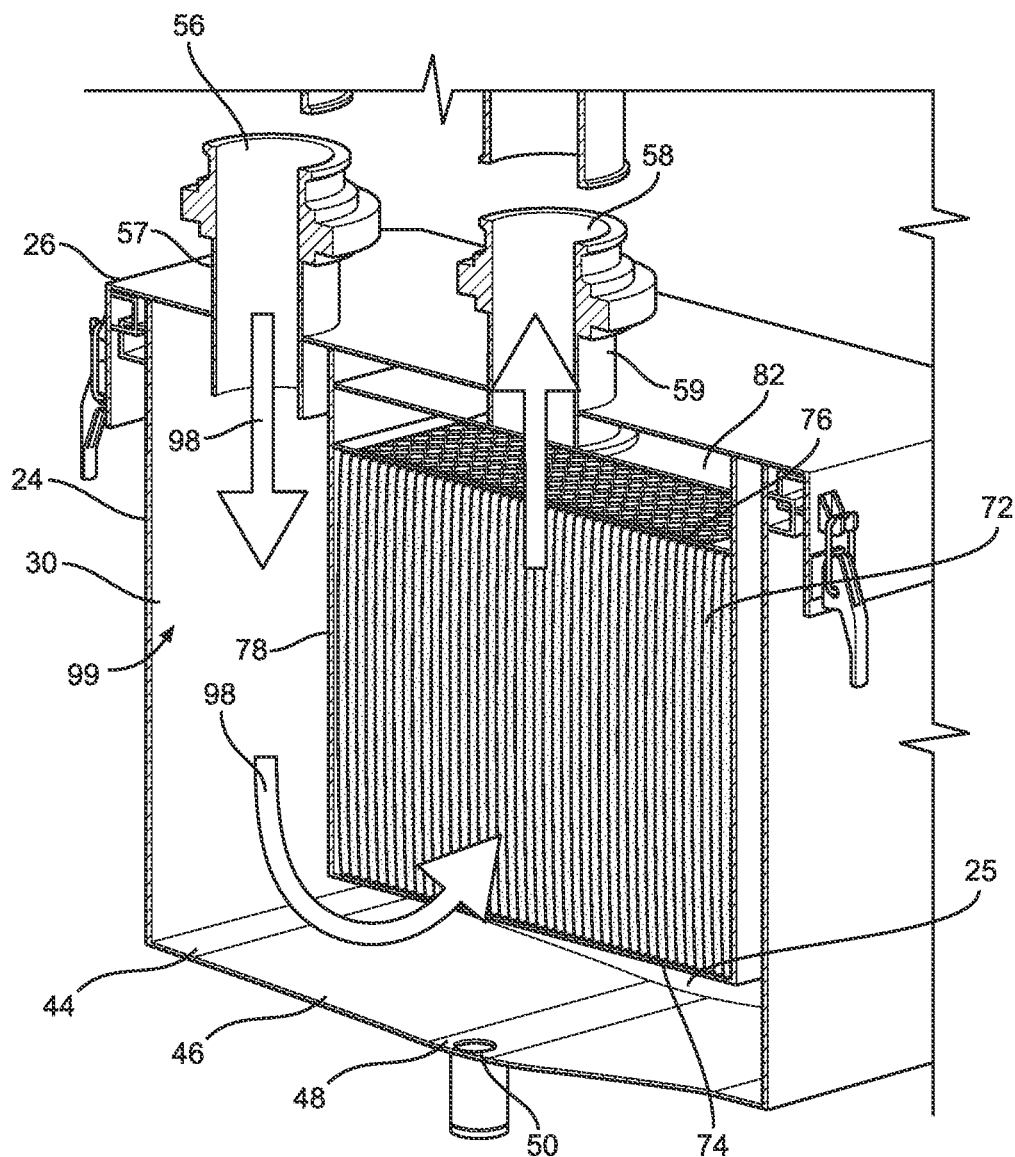
FIG. 3 is a perspective, cross-sectional view showing gas flow through the filter assembly of FIG. 1.

FIGS. 1-3 depict an example embodiment of a filter assembly 20. The filter assembly 20 can be used in a variety of systems, including closed loop systems. In closed loop systems, gas, such as air, containing particulate and gaseous or vaporized matter is taken into the filter assembly 20, filtered to remove the particulate, and then the filtered gas is exhausted. This exhausted gas may again be used in the overall system, without being expelled to the ambient atmosphere. Examples of these types of systems include electronics fabrication, laser marking, laser cutting, engraving, and pharmaceuticals. The filter assembly 20 disclosed herein can be helpful in providing for safety when filtering and transporting filtered high risk particulate in controlled atmospheres. This solution is provided by the use of a seal arrangement, which shares differential pressure load. The sharing of the differential pressure load lowers the risk of leakage across the seal arrangement in applications such as 3D printing of metal powders, which are known as pyrophoric. In addition, the filter assembly 20 disclosed herein can be helpful in extending the life of the internal filter element.

In FIGS. 1-3, the filter assembly 20 includes a filter housing 22. The filter housing 22 includes, collectively, a container 24 and a lid 26.

The container 24 includes a surrounding wall 28 defining an open interior volume 30 (FIG. 2). The surrounding wall 28 is depicted as generally box or rectangular shaped, but it could be other shapes.

In the example shown, the container 28 has a front wall 32, an opposite back wall 34, a first side wall 36, and an opposite second side wall 38. The first side wall 36 and second side wall 38 extend between and join the front wall 32 and back wall 34.

A terminal end of each of the front wall 32, back wall 34, first side wall 36, and second side wall 38 forms an end rim 40. The end rim 40 has a generally horizontal support surface 41 defines an access opening 42. The access opening 42 is in communication with the interior volume 30 and allows access into the interior volume 30.

Opposite of the access opening 42 is a bottom wall 44 (FIG. 3). The bottom wall 44 is sloping, or sloped, from each of the walls 32, 34, 36, 38 to form a generally shaped funnel portion 46. The funnel portion 46 leads to an aperture 48 in the bottom wall 44. In the example shown, the aperture 48 is generally centered along the bottom wall 44. The aperture may be covered by an openable and closable fitment 50. The fitment 50 can be opened to drain any collecting debris resting on the bottom wall 44.

The container 24 will typically be made from a hard, rigid material, such as metal.

In reference again to FIGS. 1 and 2, the lid 26 is depicted removably mounted on the end rim 40 of the container 24 to cover the access opening 42. The lid 26 is shown to be completely removable from the housing 24, although other embodiments, it could be pivotably mounted relative to the container 24.

The lid 26 includes a main section 52, which covers the access opening 42, and a surrounding skirt 54 extending generally perpendicular from the main section 52. The skirt 54 extends and overlaps the portion of the container 24 adjacent the access opening 42, when the lid 26 is in covering relation to the access opening 42.

A gas inlet 56 and gas outlet 58 are provided in at least one of the container 24 and the lid 26. In preferred implementations, the apertures for the gas inlet 56 and gas outlet 58 are contained in a same plane, i.e. are co-planar. The gas inlet 56 is surrounded by a gas inlet tube 57, and the gas outlet 58 is surrounded by a gas outlet tube 59. The outlet tube 59 extends into the interior volume 30 of the container 24.

In the example embodiment shown, the lid 26 includes the gas inlet 56 and gas outlet 58 extending through the main section 52. When the lid 26 is mounted on the container 24, interior ends of the gas inlet 56 and gas outlet 58 extend or project into the interior volume 30 of the container 24. Exterior ends of the gas inlet 56 and gas outlet 58 are constructed and arranged to be releasably clamped to tubes or hoses that are in communication with the system being filtered.

The lid 26 can further include a handle 60. The handle 60, in this embodiment, is shown connected to the skirt 54 and is helpful in removing the lid 26 from the container 24.

In FIGS. 1-3, the housing 22 further includes a clamp arrangement 90. The clamp arrangement 90 provides a releasable clamping force between the container 24 and the lid 26. While many alternatives are possible, in the example shown, the clamp arrangement 90 includes a plurality of clamp levers 92 attached to the container 24 adjacent the access opening 42, which engage a plurality of catches 94 (receivers) secured to the skirt 54 of the lid 26. The levers 92 control u-shaped arms 96 (FIG. 6) that can be selectively engaged or disengaged from the catches 94. While many variations are possible, in the example shown, the clamp arrangement 90 shown are latch style toggle clamps.

In FIGS. 1 and 2, it can be seen how the filter assembly 20 is portable by being mounted on a wheeled cart 62. The container 24 is supported or held by the cart 62 and may be moved to a desired location using the wheels 64 to roll the cart 62 to the desired location.

In reference to again to FIG. 2, the filter assembly 20 includes a filter element 70. The filter element 70 is positioned or oriented within the interior volume 30 of the container 24 for filtering gas that is drawn into the interior volume 30. An example filter element is shown in more detail in FIG. 3.

In FIG. 3, the filter element 70 includes a media pack 72. The media pack 72 can be made from a variety of filter media. This example, the media pack 72 is made from pleated media, such as pleated paper. Others types of media are usable including Z-media.

Z-media can include fluted, such as corrugated or pleated, media secured to a facing sheet. Typically, the facing sheet is non-fluted, non-corrugated. The Z-filter media can form a set of longitudinal (axial) flutes or air flow channels on one side of the corrugated or fluted media, and another set of longitudinal (axial) flow channels on an opposite side of the fluted media. The term "axial" in connection with the definition of longitudinal flutes is meant to refer to a direction of flute extensions between opposite flow faces. Flutes of one set of flutes are inlet flutes and are left open at the inlet end side of the media and are sealed or otherwise folded closed at an outlet end side of the media. Analogously, the flutes of a second set of flutes are outlet flutes and are sealed or otherwise closed at the inlet end side of the media, and are left open at the outlet end of the media. In operation, the air passes into the inlet flow face of the media pack by passage into the open inlet flutes at an upstream face of the filter. The air cannot flow out of the closed ends of these inlet flutes, so it must pass through the filter media into the outlet flutes. The filtered air then passes outwardly from the outlet flutes and through the downstream flow face.

The filter element 70 includes an inlet face 74 and an opposite outlet face 76. In this embodiment, a casing 78 holds the media pack 72 around the sides between the inlet face 74 and outlet face 76. Gas to be filtered flows into the inlet face 74, through the pleated media, and exits the filter element by flowing out of the outlet face 76. The pleated media removes particulate from the gas stream.

The filter element 70 includes an outlet opening 80. The casing 78 includes an outlet wall 82 spaced from the outlet face 76. The outlet wall 82 defines the outlet opening 80.

Figure 7:
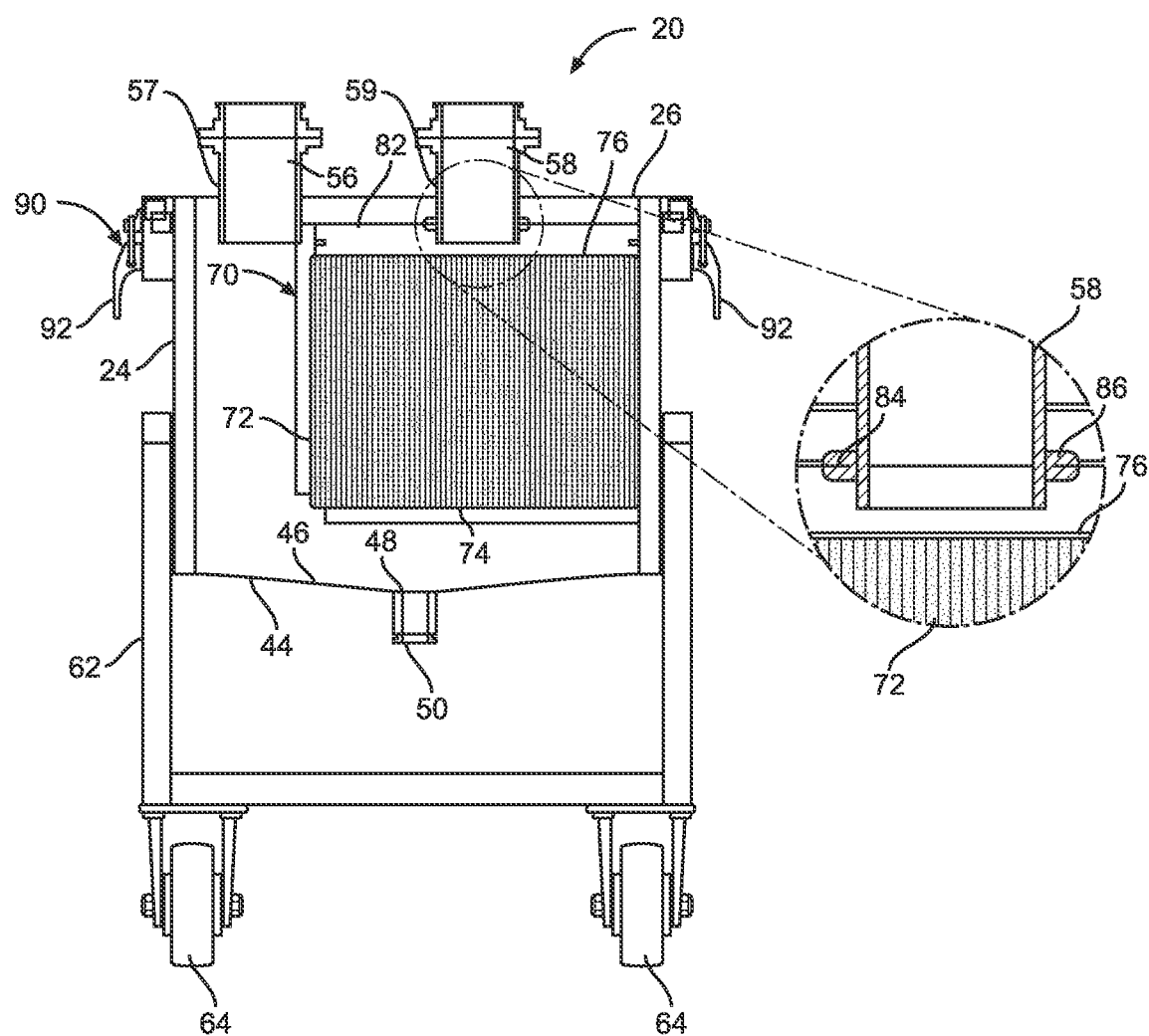
FIG. 7 is another cross-sectional view of the filter assembly of FIG. 1 and showing an enlarged view of a seal arrangement between an outlet tube of the filter housing and an outlet opening in the filter element.

The outlet opening 80 includes a surrounding inner rim 84 (FIG. 7). The outlet opening 80 is sized to receive the outlet tube 59 from the lid 26. In FIG. 7, it can be seen how the outlet opening 80 of the filter element 70 includes a seal member 86, for example a radial seal member 86, along the inner rim 84 of the outlet opening 80. The seal member 86 forms a seal by compression of the radial seal member 86 between and against the inner rim 84 of the outlet opening 80 and the outlet tube 59.

Figure 4:
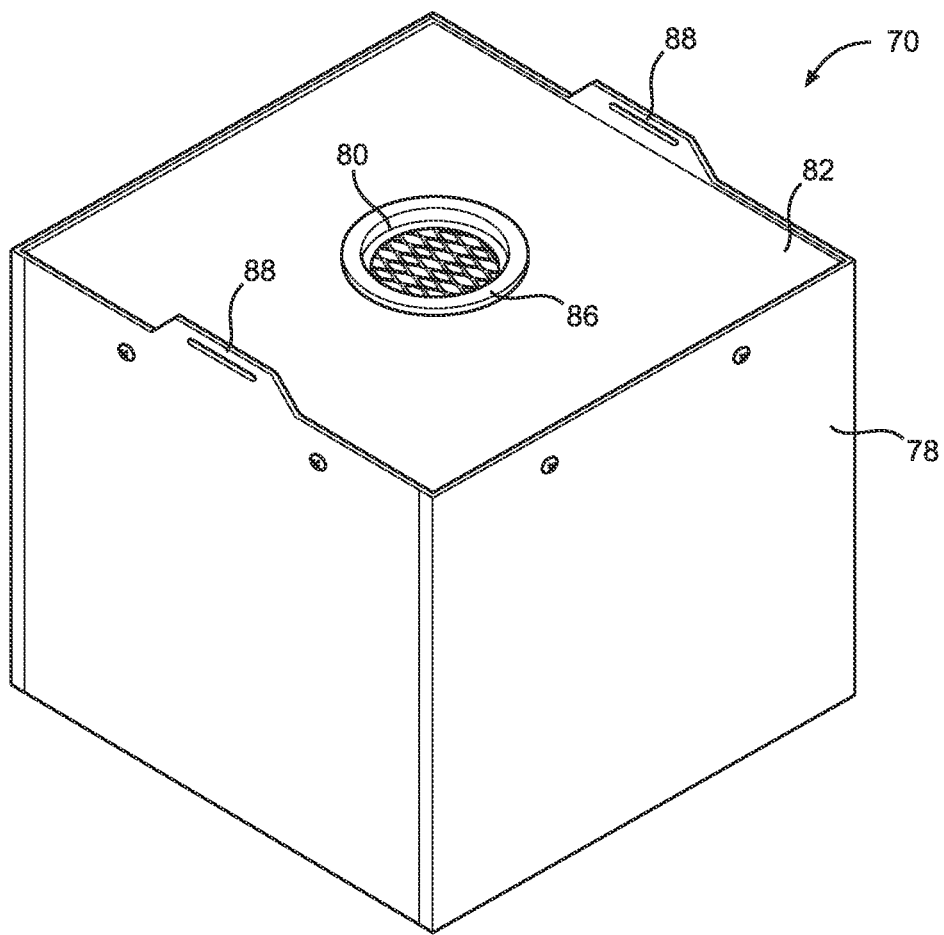
FIG. 4 is a top perspective view of the filter element shown in FIG. 2.
Figure 5:
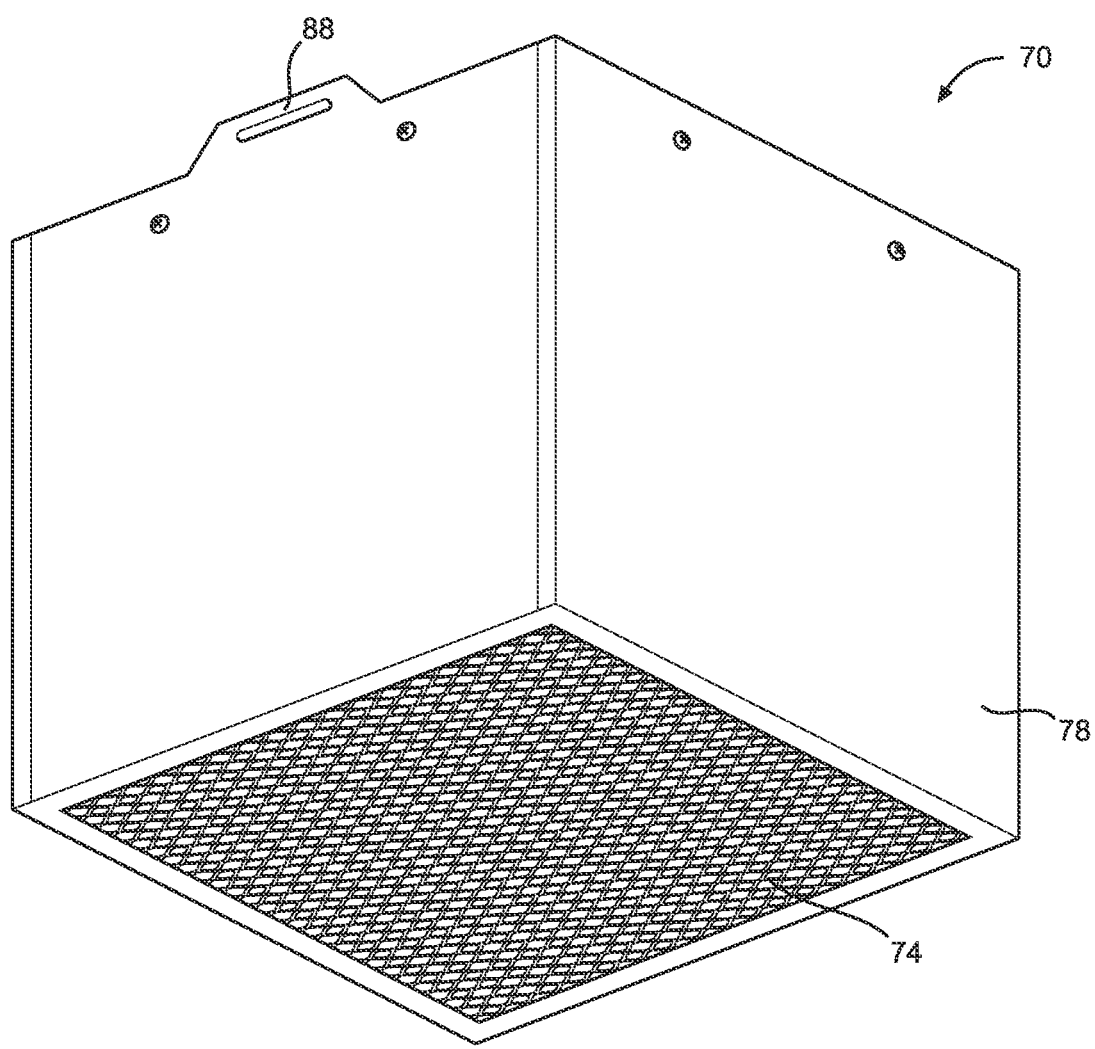
FIG. 5 is a bottom perspective view of the filter element shown in FIG. 4.

In reference again to FIGS. 4 and 5, the casing 78 of the filter element 70 further includes a pair of handles 88. The handles 88 extend or project above a plane containing the outlet wall 82 of the casing 78 and can be grasped in order to move the filter element 70 into or out of the interior volume 30 of the container 24.

In reference to FIG. 3, inlet gas is shown at arrow 98. As can be seen in FIG. 3, the gas inlet 56 and the filter element 70 are arranged such that inlet gas 98 turns at least 90° to flow from the gas inlet 56 to the inlet face 74 of the filter element 70. In preferred embodiments, the gas inlet 56 and the filter element 70 are arranged such that inlet gas 98 turns between 160°-200° (i.e., about 180°) to flow from the gas inlet 56 to the inlet face 74 of the filter element 70.

In preferred arrangements, an inlet cavity 99 (FIG. 3) of the container 24 is of a greater cross sectional area than that of the gas inlet tube 57, and therefore, the flow velocity of the gas inlet air 98 drops. Additionally, the flow changes direction by 180 degree turn to enter the inlet flow face 74 of the filter element 70. This change in direction further slows the flow velocity of the gas inlet air 98 and further provides opportunity for suspended heavy particulate to drop from the gas inlet air 98. The particulate drops to the funnel portion 46 of the bottom wall 44 of the container 24, and can be selectively removed by opening the fitment 50 of the aperture 48.

From a review of FIG. 3, the casing 78 of the element 70 can function as a baffle for the inlet flow 98 from the gas inlet 56 to the inlet face 74 of the media pack 72.

Still in reference to FIG. 3, in preferred implementations, the container 24 includes a ledge 25 protruding into the interior volume 30 constructed and arranged to hold the filter element 70. Many variations are possible.

Figure 6:
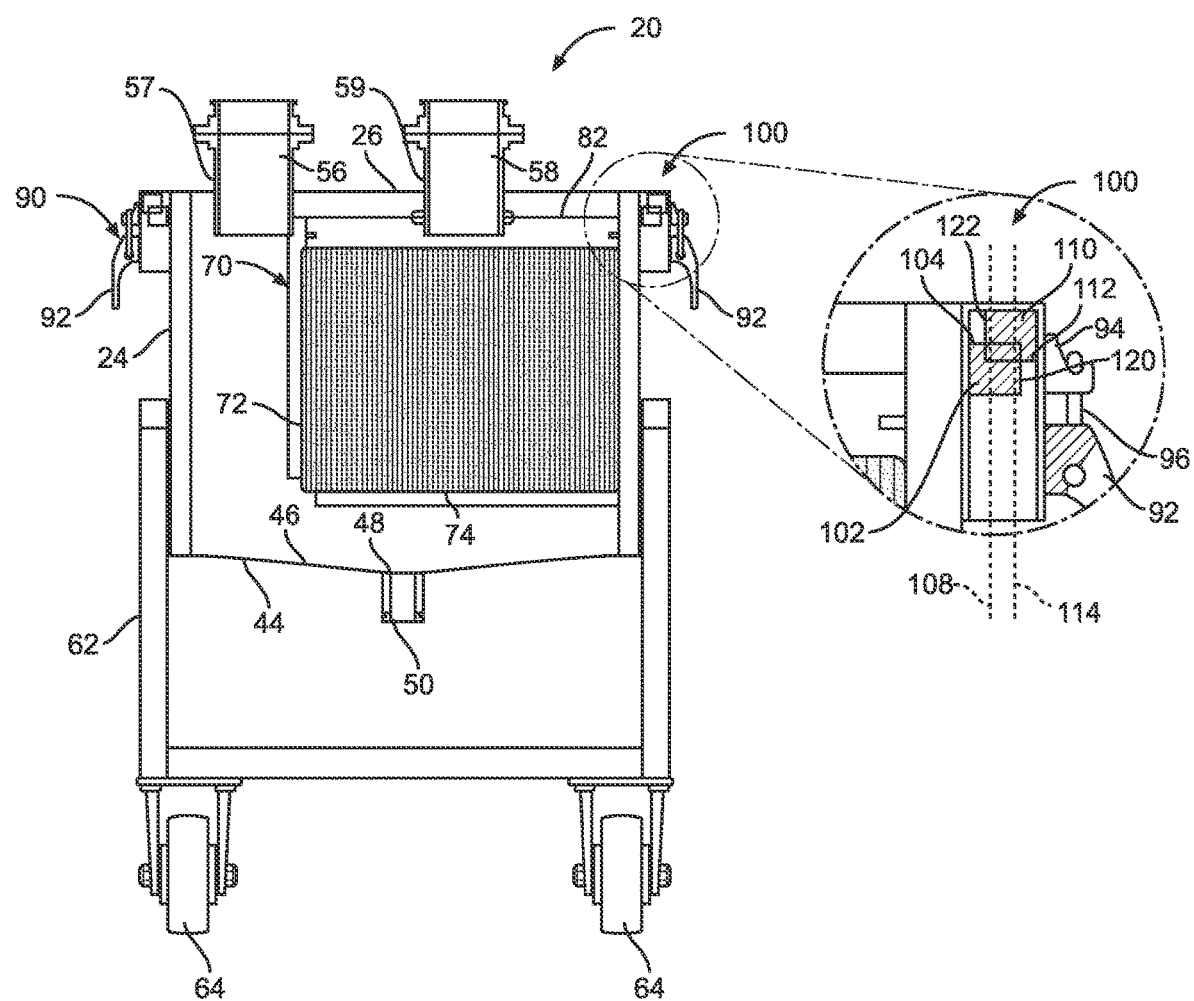
FIG. 6 is a cross-sectional view of the filter assembly of FIG. 1 and showing an enlarged view of a portion of the seal arrangement between a lid and a container of the filter housing.

The filter assembly 20 further includes a seal arrangement 100 (FIG. 6). The seal arrangement 100 is between the lid 26 and the container 24 mounted to form a releasable seal therebetween. The seal arrangement 100 includes a container gasket 102. The container gasket 102 is secured to the container 24 at a position surrounding the access opening 42. In this example, the container gasket 102 is secured on an axial surface of the support surface 41 of the container 24.

The container gasket 102 includes a sealing portion 104 which is oriented in a direction toward the lid 26. The container gasket 102 defines a first longitudinal axis 108 (FIG. 6) passing through a center of the cross-sectional width of the gasket 102. The longitudinal axis 108, in this example, is generally parallel to the first side wall 36 of the surrounding wall 28 of the container 24.

The seal arrangement 100 further includes a lid gasket 110. The lid gasket 110 has a sealing region 112 oriented in a direction toward the container 24. The lid gasket 110 has a second longitudinal axis 114 (FIG. 6) passing through a center of the cross-section width of the gasket 110. The second longitudinal axis 114 is generally parallel to the first longitudinal axis 108, and, as can be seen in FIG. 6, is offset or spaced from the first longitudinal axis 108. The distance of this offset can be at least 5 mm, and no greater than the cross-sectional width 126 (FIG. 8) of the gaskets, which is about 30 mm, and will often be about 10-15 mm.

As can be seen in FIG. 6, the sealing portion 104 of the container gasket 102 and the sealing region 112 of the lid gasket 110 are compressed against each other to form the releasable seal between the lid 26 and the container 24.

Still in reference to FIG. 6, the container gasket 102 includes a first rigid projection 120 along an outermost periphery of the container gasket 102. The first rigid projection 120 can be generally parallel to the longitudinal axis 108. Similarly, the lid gasket 110 includes a second rigid projection 122 along an innermost periphery of the lid gasket 110. The second rigid projection 122 can be generally parallel to the longitudinal axis 114. When the container gasket 102 and lid gasket 110 are compressed against each other, a first rigid projection 120 is pressed into the sealing region 112 of the lid gasket 110, and the second rigid projection 122 is pressed into the sealing portion 104 of the container gasket 102. This pressing of the respective rigid projections 120, 122 into the opposing gasket member helps create a reliable, releasable, and repeatable seal.

By reviewing FIGS. 3 and 6, it should be appreciated that the gas inlet 56 and gas outlet 58 of the lid 26 are within the perimeter of the seal arrangement 100.

Figure 8:
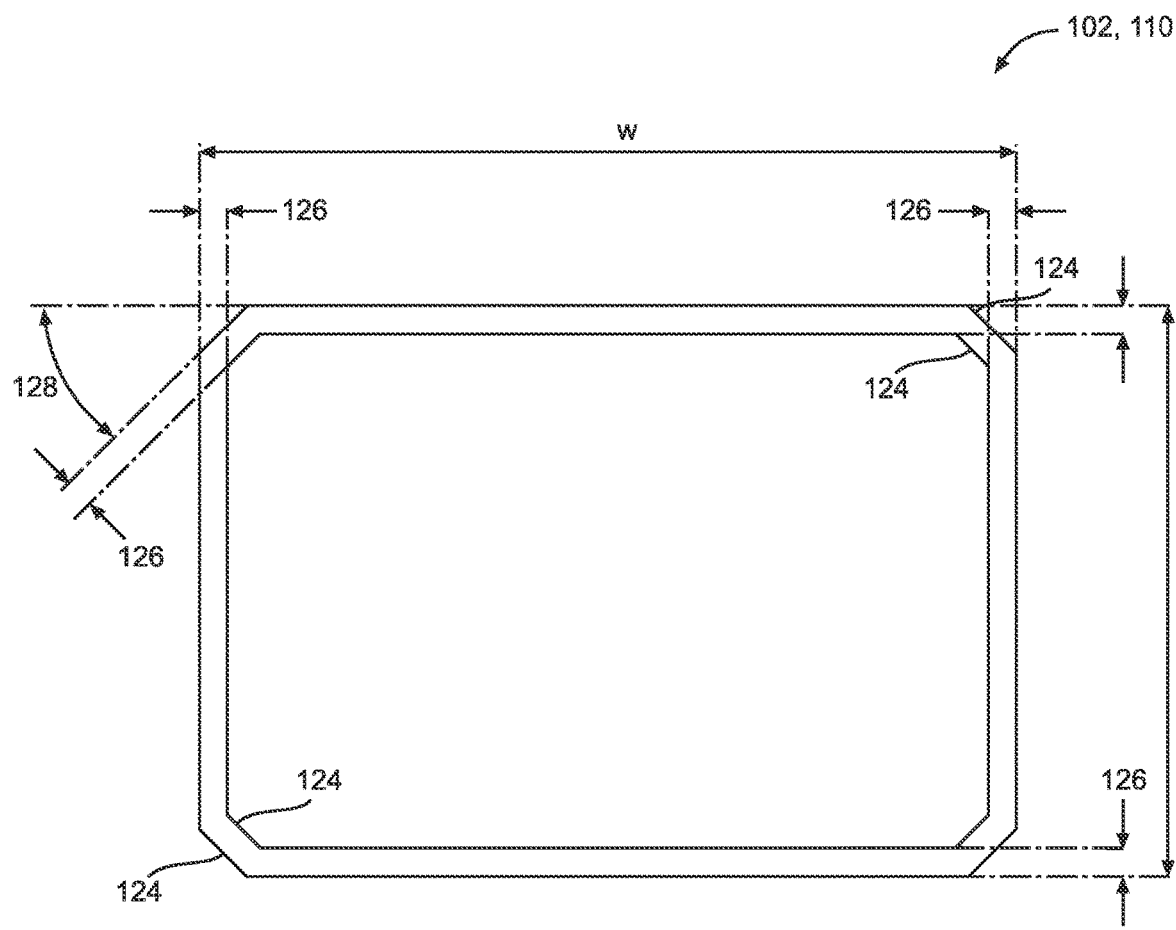
FIG. 8 is a top plan view of one of the filtered gaskets used in the seal arrangement between the lid and container depicted in FIG. 6.
Figure 9:
FIG. 9 is a front view of the gasket of FIG. 8.
Figure 10:
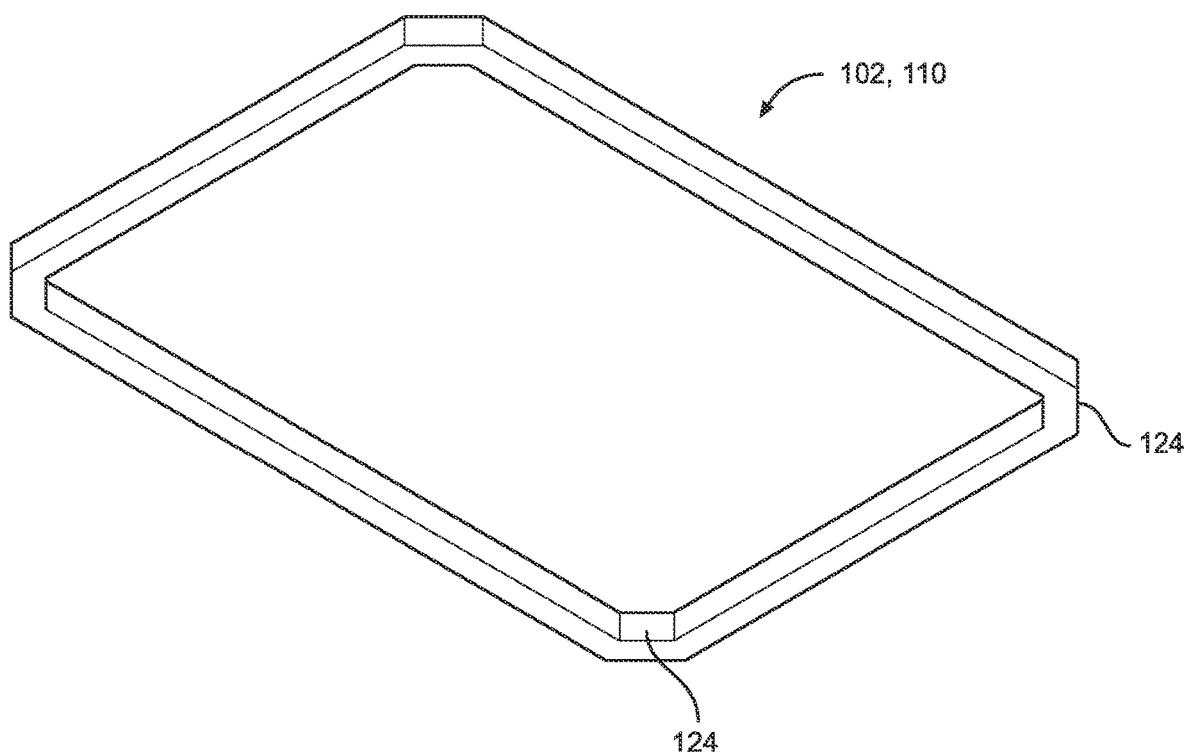
FIG. 10 is a perspective view of the gasket of FIG. 8.

FIGS. 8-10 show an example embodiment for the container gasket 102 and lid gasket 110. In this example, the container gasket 102 and the lid gasket 110 have the same geometry and dimensions. In other embodiments, there can be variations between the two.

In this example, each of the container gasket 102 and lid gasket 110 has a thickness t (FIG. 9) of about 10-30 mm, or about 20 mm; an overall length width w (FIG. 8) of about 500-600 mm; and a length l of about 350-450 mm. The cross-sectional width at 126 can be about 10-30 mm, or about 20 mm. Each can be shaped to have a closed perimeter (closed outermost periphery) formed from two straight parallel segments, with two straight parallel extensions extending between the two segments, i.e. having a generally rectangular in shape but with the outside and inside corners truncated, to form flat surfaces 124. The angle 128 of the truncated corners to form the flat surfaces 124 can be about 40-50°, e.g. about 45°.

Preferably, the container gasket 102 and lid gasket 110 are made from a single piece of material. For example, they can be cut from a material of closed cell rubber. Other ways of making the gaskets 102, 110, are possible, including extrusion or molding.

In general, the gaskets 102, 110 will be formed to maintain a functional compression with 3-6 mm compression. The gaskets can withstand a temperature of up to 120° C. the pressure range can be from −200 mBar up to +200 mBar. They will have the durability to allow up to 600 compressions.

The above materials can be used in a method of sealing a filter housing, such as the filter housing 20. The method includes covering the lid 26 over the container 24 to compress the sealing portion 104 of the container gasket 102 and the sealing region 112 of the lid gasket 110 against each other to form a releasable seal between the lid 26 and the container 24. In doing so, the first longitudinal axis 108 and the second longitudinal axis 114 of the container gasket 102 and lid gasket 110 are offset from each other.

The method can further include engaging the clamp arrangement 90 to provide a releasable clamping force between the container 24 and the lid 26.

The step of forming the seal can further include pressing the first rigid projection 120 of the container gasket 102 into the sealing region 112 of the lid gasket 110, and pressing the second rigid projection 122 into the sealing portion 104 of the container gasket 102.

The method can further include moving the lid 26 by grasping the handle 60 secured to the lid 26.

Inventive Aspects

Inventive aspects of this disclosure include:

Aspect 1: A filter housing comprising: (a) a container with a surrounding wall defining an open interior volume; the container having an access opening in communication with the interior volume; (b) a filter element in the interior volume; the filter element having an inlet face and outlet face and oriented for filtering gas by gas flow through the inlet face and out through the outlet face; (c) a lid removably mounted on the container to cover the access opening; and (d) a gas inlet and gas outlet in at least one of the container and lid; the gas inlet and gas outlet being co-planar; wherein the gas inlet and the filter element are arranged such that inlet gas turns at least 90° to flow from the gas inlet to the inlet face of the filter element.

Aspect 2. The filter housing of aspect 1 wherein the lid includes the gas inlet and the gas outlet.

Aspect 3. The filter housing of any one of aspects 1 and 2 wherein: (a) the gas outlet includes an outlet tube extending into the interior volume of the container; and (b) the filter element has an outlet opening receiving the outlet tube.

Aspect 4. The filter housing of aspect 3 wherein the filter element includes: (a) a media pack having the inlet face and the outlet face; and (b) a casing holding the media pack; wherein the casing includes an outlet wall spaced from the outlet face; the outlet wall defining the outlet opening of the filter element.

Aspect 5. The filter housing of aspect 4 wherein the casing has a surrounding wall extending between the outlet wall and the inlet face of the media pack.

Aspect 6. The filter housing of aspect 5 wherein the surrounding wall of the casing provides a baffle for inlet flow from the gas inlet to the inlet face of the media pack.

Aspect 7. The filter housing of any one of aspects 4-6 wherein the media pack comprises pleated media.

Aspect 8. The filter housing of any one of aspects 1-7 wherein the gas inlet and the filter element are arranged such that inlet gas turns between 160°-200° to flow from the gas inlet to the inlet face of the filter element.

Aspect 9. The filter housing of any one of aspects 1-8 wherein the container includes a ledge protruding into the interior volume constructed and arranged to hold the filter element.

Aspect 10. The filter housing of any one of aspects 1-9 wherein: (a) the container includes a filtering compartment and a debris collector disposed below the filtering compartment; (i) the filtering compartment and debris collector separated by a sloping wall having an aperture; the aperture covered by an openable and closeable fitment.

Aspect 11. The filter housing of any one of aspects 1-10 further including a seal arrangement between the compartment and the lid, and a clamp arrangement providing a releasable clamping force holding the compartment and lid together in sealing engagement.

Aspect 12. A method of filtering a gas comprising: (a) providing a container, a filter element in an interior volume of the container; and a lid mounted on the container; and (b) allowing gas to flow through a gas inlet, turn at least 90°, flow into the filter element, and then exit through a gas outlet; wherein the inlet and gas outlet are co-planar.

Aspect 13. The method of aspect 12 wherein the gas turns between 160°-200° to flow into the filter element.

Aspect 14. The method of any one of aspects 12 and 13 wherein the filter element includes a media pack having the inlet face and the outlet face; and a casing holding the media pack; wherein the casing has an outlet wall and a surrounding wall, the surrounding wall extending between the outlet wall and the inlet face of the media pack; and the step of allowing gas to flow includes the surrounding wall being a baffle for inlet flow from the gas inlet to the inlet face of the media pack.

Aspect 15. The method of any one of aspects 12-14 wherein the container includes a filtering compartment and a debris collector disposed below the filtering compartment; and while the gas flows from the gas inlet to the filter element, debris drops by gravity to a bottom of the filtering compartment.

The above represents example principles. Many embodiments can be made using these principles.

What is claimed is:

1. A filter housing comprising:
   (a) a container with a surrounding wall defining an open interior volume; the container having an access opening in communication with the interior volume;
   (b) a filter element in the interior volume; the filter element including a media pack having an inlet face and outlet face and oriented for filtering gas by gas flow through the inlet face and out through the outlet face; the filter element including a casing holding the media pack, wherein the casing includes an outlet wall spaced from the outlet face; the outlet wall defining an outlet opening of the filter element;
   (c) a lid removably mounted on the container to cover the access opening; and
   (d) a gas inlet and gas outlet in at least one of the container and lid; the gas inlet and gas outlet being co-planar;
       (i) the gas outlet includes an outlet tube extending into the interior volume of the container; and
       (ii) the filter element outlet opening receiving the outlet tube;
   wherein the gas inlet and the filter element are arranged such that inlet gas turns at least 90° to flow from the gas inlet to the inlet face of the filter element.

2. The filter housing of claim 1 wherein the lid includes the gas inlet and the gas outlet.

3. The filter housing of claim 1 wherein the casing has a surrounding wall extending between the outlet wall and the inlet face of the media pack.

4. The filter housing of claim 3 wherein the surrounding wall of the casing provides a baffle for inlet flow from the gas inlet to the inlet face of the media pack.

5. The filter housing of claim 1 wherein the media pack comprises pleated media.

6. The filter housing of claim 1 wherein the gas inlet and the filter element are arranged such that inlet gas turns between 160°-200° to flow from the gas inlet to the inlet face of the filter element.

7. The filter housing of claim 1 wherein the container includes a ledge protruding into the interior volume constructed and arranged to hold the filter element.

8. The filter housing of claim 1 wherein:
(a) the container includes a filtering compartment and a debris collector disposed below the filtering compartment;
   (i) the filtering compartment and debris collector being separated by a sloping wall having an aperture; the aperture covered by an openable and closeable fitment.

9. The filter housing of claim 1 further including a seal arrangement between the container and the lid, and a clamp arrangement providing a releasable clamping force holding the container and lid together in sealing engagement.

10. A filter housing comprising:
(a) a container with a surrounding wall defining an open interior volume; the container having an access opening in communication with the interior volume;
(b) a filter element in the interior volume; the filter element including a media pack having an inlet face and outlet face and oriented for filtering gas by gas flow through the inlet face and out through the outlet face; the filter element including a casing holding the media pack, wherein the casing includes an outlet wall spaced from the outlet face;
(c) a lid removably mounted on the container to cover the access opening; and
(d) a gas inlet and gas outlet in the lid; the gas inlet and gas outlet being co-planar; the gas inlet having a first central axis in a direction of gas flow, and the gas outlet having a second central axis in the direction of gas flow; the first central axis and second central axis being parallel to each other;
wherein the gas inlet and the filter element are arranged such that inlet gas turns at least 90° to flow from the gas inlet to the inlet face of the filter element.

11. The filter housing of claim 10 wherein the gas inlet and the filter element are arranged such that inlet gas turns between 160°-200° to flow from the gas inlet to the inlet face of the filter element.

12. The filter housing of claim 10 wherein the container includes a ledge protruding into the interior volume constructed and arranged to hold the filter element.

13. The filter housing of claim 10 wherein:
(a) the container includes a filtering compartment and a debris collector disposed below the filtering compartment;
   (i) the filtering compartment and debris collector being separated by a sloping wall having an aperture; the aperture covered by an openable and closeable fitment.

14. The filter housing of claim 10 further including a seal arrangement between the container and the lid, and a clamp arrangement providing a releasable clamping force holding the container and lid together in sealing engagement.

15. A filter housing comprising:
(a) a container with a surrounding wall defining an open interior volume; the container having an access opening in communication with the interior volume;
   (i) the container includes a filtering compartment and a debris collector disposed below the filtering compartment; the filtering compartment and debris collector being separated by a sloping wall having an aperture; the aperture covered by an openable and closeable fitment;
(b) a filter element in the interior volume; the filter element having an inlet face and outlet face and oriented for filtering gas by gas flow through the inlet face and out through the outlet face;
(c) a lid removably mounted on the container to cover the access opening; and
(d) a gas inlet and gas outlet in at least one of the container and lid; the gas inlet and gas outlet being co-planar;
   (i) the gas outlet includes an outlet tube extending into the interior volume of the container; and
   (ii) the filter element outlet opening receiving the outlet tube;
wherein the gas inlet and the filter element are arranged such that inlet gas turns at least 90° to flow from the gas inlet to the inlet face of the filter element.

16. The filter housing of claim 15, wherein the lid includes the gas inlet and the gas outlet.

17. The filter housing of claim 15 wherein the container includes a ledge protruding into the interior volume constructed and arranged to hold the filter element.

18. The filter housing of claim 15 further including a seal arrangement between the container and the lid, and a clamp arrangement providing a releasable clamping force holding the container and lid together in sealing engagement.

* * * * *